United States Patent
Rollinger et al.

(10) Patent No.: US 10,895,182 B2
(45) Date of Patent: Jan. 19, 2021

(54) METHOD AND SYSTEM FOR PARTICULATE FILTER REGENERATION

(71) Applicant: Ford Global Technologies, LLC, Dearborn, MI (US)

(72) Inventors: John Rollinger, Troy, MI (US); Douglas Martin, Canton, MI (US); Vincent Martinez, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/975,583

(22) Filed: May 9, 2018

(65) Prior Publication Data

US 2019/0345857 A1 Nov. 14, 2019

(51) Int. Cl.
| | |
|---|---|
| *F01N 3/023* | (2006.01) |
| *F02D 41/02* | (2006.01) |
| *F01N 3/035* | (2006.01) |
| *F01N 3/10* | (2006.01) |
| *F01N 9/00* | (2006.01) |
| *F01N 13/00* | (2010.01) |

(52) U.S. Cl.
CPC .......... *F01N 3/0234* (2013.01); *F01N 3/035* (2013.01); *F01N 3/101* (2013.01); *F01N 9/002* (2013.01); *F01N 13/009* (2014.06); *F02D 41/029* (2013.01); *F01N 2560/05* (2013.01)

(58) Field of Classification Search
CPC .......... F01N 9/002; F01N 3/101; F01N 3/023; F01N 13/009; F01N 3/021; F01N 3/30; F01N 3/32
See application file for complete search history.

(56) References Cited

U.S. PATENT DOCUMENTS

| | | | | |
|---|---|---|---|---|
| 6,543,219 | B1 * | 4/2003 | Surnilla | F01N 3/0842 60/274 |
| 8,683,786 | B2 | 4/2014 | Ruona et al. | |
| 9,163,543 | B2 | 10/2015 | Cavataio et al. | |
| 9,376,949 | B2 | 6/2016 | Gandhi et al. | |
| 2005/0132697 | A1 * | 6/2005 | Ament | F01N 3/32 60/289 |
| 2011/0072788 | A1 * | 3/2011 | Ruona | F01N 3/023 60/276 |

FOREIGN PATENT DOCUMENTS

DE  202014002160 U1 * 6/2015

OTHER PUBLICATIONS

English Tranlsation of DE-202014002160-U1 (Year: 2015).*

(Continued)

*Primary Examiner* — Anthony Ayala Delgado
(74) *Attorney, Agent, or Firm* — Geoffrey Brumbaugh; McCoy Russell LLP

(57) ABSTRACT

Methods and systems are provided for heating an exhaust particulate filter (PF) to enable filter generation. In one example, a method may include adjusting engine air fuel ratio and injecting secondary air flow upstream of the PF to increase PF temperature. The level of engine air fuel ratio adjustment and the amount of secondary air injection upstream of the PF may be adjusted to account for enrichment induced cooling at a three-way catalyst (TWC) positioned upstream of the PF.

19 Claims, 5 Drawing Sheets

(56) References Cited

OTHER PUBLICATIONS

Kelly, T. et al., "Method and System for Particulate Filter Regeneration," U.S. Appl. No. 15/660,747, filed Jul. 26, 2017, 67 pages.
Van Nieuwstadt, M. et al., "Gasoline Particulate Filter Diagnostics," U.S. Appl. No. 15/673,561, filed Aug. 10, 2017, 82 pages.
Rollinger, J. et al., "Gasoline Particulate Filter Diagnostics," U.S. Appl. No. 15/673,612, filed Aug. 10, 2017, 82 pages.

* cited by examiner

METHOD AND SYSTEM FOR PARTICULATE FILTER REGENERATION

FIELD

The present description relates generally to methods and systems for heating an exhaust particulate filter to enable filter generation.

BACKGROUND/SUMMARY

Direct injection engines may provide increased performance so that engine efficiency may be improved. Directly injecting fuel into a cylinder can reduce temperature in a cylinder so that more air and fuel may be drawn into the cylinder. However, the air-fuel mixture within the cylinder may not be fully vaporized at the time of ignition at higher engine speeds and loads since there is less time to mix air with the fuel. Consequently, a portion of injected fuel may not completely oxidize, thereby forming carbonaceous soot within the cylinder. After the soot is expelled from the engine, the soot may be stored in a particulate filter for subsequent oxidation.

Some internal combustion engines employ a particulate filter or PF (e.g., gasoline particulate filter, GPF, or diesel particulate filter, DPF, based on the engine fueling configuration) in an exhaust system to trap particulate matter flowing through the exhaust system and thereby meet emission standards. However, if the PF is not periodically cleaned or regenerated, the accumulated particulate matter on the PF may cause an increase in the exhaust system backpressure which may further lead to decreased engine performance.

In order to periodically regenerate or purge the PF of particulate matter, measures may be taken to increase the exhaust gas temperature to above a predetermined temperature (e.g., above 600° C.) to incinerate the carbon particles accumulated in the filter. In some cases, PF may reach a high enough exhaust temperature during normal vehicle operation to passively perform a particulate filter regeneration. However, due to the location of the PF in the exhaust system (disposed downstream of an oxidizing catalyst (e.g. three way catalyst)), it may take longer than is desired for temperatures in the exhaust system to reach the PF so that regeneration may be initiated.

One example approach for expediting PF regeneration is shown by Ruona et al. in U.S. Pat. No. 8,683,786. Therein, engine exhaust air fuel ratio may be adjusted and/or spark timing may be retarded from maximum brake torque (MBT) to increase temperature of the PF. In response to a temperature of the PF being greater than a temperature threshold and a richer than stoichiometric engine air fuel ratio, secondary air may be introduced to the exhaust passage upstream of the PF via an air injector. The air injector may be coupled to the exhaust passage between an exhaust catalyst and the PF. By introducing the secondary air, the oxidation rate of soot in the PF may be increased.

However, the inventors herein have recognized potential issues with such systems. As one example, enrichment and air injection to the exhaust passage may cause a decrease in the temperature of the catalyst coupled to the exhaust passage upstream of the PF. A drop in catalyst temperature may adversely affect emissions quality. By retarding spark timing for PF temperature increase, fuel efficiency may reduce. In one example, the operator may be indicated via an on board human-machine-interface (HMI) to execute a specific drive cycle suited for increasing PF temperature. However, such indications may cause an undesirable drive experience.

In one example, the issues described above may be addressed by a method for an engine, comprising: method, comprising: routing exhaust gases from an engine through a three-way catalyst (TWC) and then through a gasoline particulate filter (GPF), controlling enrichment of the engine exhaust gases to be overall richer than stoichiometry at the GPF, injecting air into the GPF to create an exotherm with the enriched exhaust gases entering the GPF, and controlling a degree of the enrichment to reduce any induced cooling of the TWC caused by the enrichment. In this way, PF heating may be expedited while maintaining an upstream catalyst at a desired temperature.

As one example, an air pump may be coupled, via respective valves, to two air injectors supplying air to the exhaust passage. A first air injector may be coupled to the exhaust passage upstream of particulate filter (PF) and downstream of an exhaust catalyst, and a second air injector coupled to the exhaust passage upstream of the exhaust catalyst. A plurality of oxygen sensors and temperature sensors may be coupled to the exhaust passage, upstream and downstream of each of the catalyst and the PF. Responsive to PF regeneration conditions being met (e.g., when PF soot load exceeds a threshold), but the temperature at the filter being insufficient for regeneration, an exotherm may be generated by operating engine cylinders with imbalance richer than stoichiometric air fuel ratio while injecting a secondary air flow upstream of the PF (via the first air injector). An amount of secondary air introduced upstream of the PF may be closed loop controlled via a proportional-integral controller based on a difference between an actual secondary airflow (amount) and a desired secondary air flow (amount). The desired secondary airflow may be estimated based on a desired PF temperature (sufficient for regeneration), a desired air fuel ratio (AFR) at the PF during regeneration, and engine air mass. While generating the exotherm at the PF, engine operating conditions such as engine AFR and spark timing may be continually adjusted to maintain a desired temperature at the exhaust catalyst upstream of the PF. During cold start conditions, an exotherm may be generated at the catalyst by injecting the secondary air flow upstream of the catalyst (via the second air injector) while enriching engine AFR or operating engine cylinders with an air-fuel imbalance.

In this way, by creating an exotherm at the particulate filter caused by varying engine AFR and secondary air injection upstream of the PF, PF regeneration may be expedited. By enhancing the exothermic effect of an AFR enrichment using a secondary air flow provided via an air pump, the time required to bring a loaded particulate filter to operating (regeneration) temperature is reduced, without degrading drivability or engine performance. By adjusting an amount of air injection via closed loop control, a desired amount of air may be supplied to heat the PF. The technical effect of continually adjusting engine AFR during secondary air flow upstream of the PF is that a cooling effect on a catalyst coupled to the exhaust passage upstream of the PF caused by the secondary air flow and engine enrichment may be mitigated and the catalyst temperature may be maintained at above its light-off temperature. By adjusting engine AFR and supplying air upstream of the catalyst, catalyst light-off may be expedited during engine cold-start conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for heating an exhaust particulate filter (PF) to enable filter generation. The PF may be coupled to an engine system, such as the engine system of FIG. 1, the engine system further including an exhaust air pump and one or more exhaust air injectors to enable expedited heating of the PF and an exhaust catalyst. An engine controller may be configured to perform control routines, such as the example routines of FIGS. 2-4, to expedite particulate filter heating to an operating temperature where regeneration can be initiated while maintaining catalyst temperature above a catalyst light-off temperature. In particular, the controller may rely on an exotherm generated via an engine air-fuel ratio adjustment, the exotherm enhanced using secondary air injection upstream of the PF and/or the catalyst. A prophetic example of coordinating secondary air injection with engine air fuel ratio adjustments for PF heating and catalyst heating is shown at FIG. 5.

Figure 1:
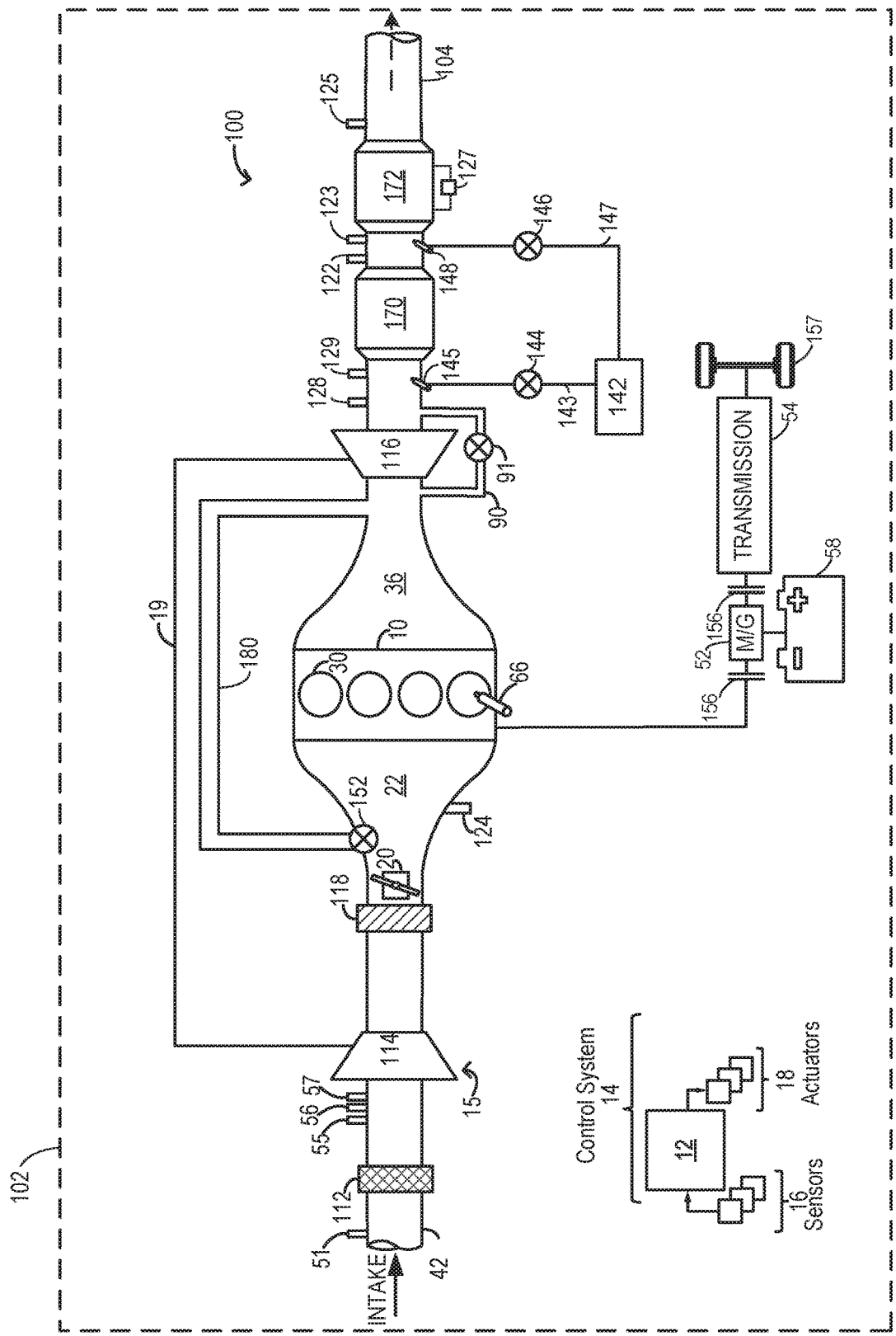
FIG. 1 shows a schematic diagram of an engine system including an exhaust catalyst and a particulate filter.

FIG. 1 shows a schematic view 101 of a vehicle system 102 with an example engine system 100 including an engine 10. In one example, the engine system 100 may be a diesel engine system. In another example, the engine system 100 may be a gasoline engine system. In the depicted embodiment, engine 10 is a boosted engine coupled to a turbocharger 15 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled through charge-air cooler (CAC) 118 to throttle valve 20. Throttle valve 20 is coupled to engine intake manifold 22. From the compressor, the compressed air charge flows through the charge-air cooler 118 and the throttle valve 20 to the intake manifold 22. In the embodiment shown in FIG. 1, the pressure of the air charge within the intake manifold 22 is sensed by manifold air pressure (MAP) sensor 124. Temperature of ambient air entering the intake passage 42 may be estimated via an intake air temperature (IAT) sensor 51.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, an ambient humidity sensor 57 may be coupled to the inlet for estimating a humidity of aircharge entering the intake manifold. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate valve 91 may be actuated open to dump at least some exhaust pressure from upstream of the turbine to a location downstream of the turbine via wastegate passage 90. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers (also referred herein as engine cylinders) 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition. Spark may be provided via spark plugs (not shown) coupled to each of the engine cylinders 30.

Exhaust gas recirculation (EGR) delivery passage 180 may be coupled to the exhaust passage 104 upstream of turbine 116 to provide high pressure EGR (HP-EGR) to the engine intake manifold, downstream of compressor 114. An EGR valve 152 may be coupled to the EGR passage 181 at the junction of the EGR passage 180 and the intake passage 42. EGR valve 152 may be opened to admit a controlled amount of exhaust to the compressor outlet for desirable combustion and emissions control performance. EGR valve 152 may be configured as a continuously variable valve or as an on/off valve. In further embodiments, the engine system may include a low pressure EGR (LP-EGR) flow path wherein exhaust gas is drawn from downstream of turbine 116 and recirculated to the engine intake manifold, upstream of compressor 114.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors coupled to the compressor inlet.

As shown in FIG. 1, exhaust from the one or more exhaust manifold sections may be directed to turbine 116 to drive the turbine. The combined flow from the turbine and the wastegate passage then flows through exhaust after-treatment device 170 (also referred herein as exhaust catalyst). In one example, the emission control device 170 may be a light-off three-way catalyst (TWC). In general, the exhaust after-treatment device 170 is configured to catalytically treat the exhaust flow, and thereby reduce an amount of one or more substances in the exhaust flow. For example, the exhaust after-treatment device 170 may be configured to trap Na, from the exhaust flow when the exhaust flow is lean, and to reduce the trapped NOx when the exhaust flow is rich. In other examples, the exhaust after-treatment device 170 may be configured to disproportionate NOx or to selectively reduce NOx with the aid of a reducing agent. In still other examples, the exhaust after-treatment device 170 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together.

A particulate filter (PF) 172 may be coupled to the exhaust passage 104 downstream of the exhaust after-treatment device 170. The particulate filter 172 may be a gasoline particulate filter or a diesel particulate filter. A substrate of the particulate filter 172 may be made of ceramic, silicon, metal, paper, or combinations thereof. During operation of the engine 10, particulate filter 172 may capture exhaust particulate matter (PMs), such as ash and soot (e.g., from unburned hydrocarbons) in order to reduce vehicle emissions. The soot may accumulate on the surfaces of the particulate filter thereby creating an exhaust backpressure. The exhaust backpressure may negatively influence the engine efficiency. In order to avoid high backpressure, when the PF soot loading reaches a threshold load, the engine 10 may opportunistically regenerate the PF in presence of a higher than threshold exhaust temperature.

Pressure in the exhaust system may be assessed by pressure sensor 127. Pressure sensor 127 may be a differential pressure sensor coupled across PF 172, for example. A load of PM accumulated on the PF 172 may be estimated based on the pressure drop across the PF as estimated via the pressure sensor 127.

A first air injector 148 may be coupled to the exhaust passage 104 upstream of the PF 172 and downstream of the emission control device 170, and a second air injector 145 may be coupled to the exhaust passage 104 upstream of the emission control device 170. The first air injector 145 may inject secondary air from an air pump 142 to the exhaust passage upstream of the PF 172 via a first air line 143 and second air injector 148 may inject secondary air from an air pump 142 to the exhaust passage 104 upstream of the emission control device 170 via a second air line 147. A first control valve 144 may be coupled to the first air line 143 to regulate air flow from the pump 142 to the first air injector 145 while a second control valve 146 may be coupled to the second air line 147 to regulate air flow from the pump 142 to the second air injector 148.

A plurality of sensors may be coupled to the exhaust passage 104 to estimate exhaust temperature and an exhaust oxygen concentration upstream and downstream of the emission control device 170 and the PF 172. A first exhaust temperature sensor 128 may be coupled to the exhaust passage 104 upstream of the emission control device 170 and a second exhaust temperature sensor 122 may be coupled to the exhaust passage 104 upstream of the PF 172 (downstream of the emission control device 170). A first exhaust oxygen sensor 129 may be coupled to the exhaust passage 104 upstream of the emission control device 170, a second exhaust oxygen sensor 123 may be coupled to the exhaust passage 104 downstream of the emission control device 170 (upstream of the PF 172), and a third exhaust oxygen sensor 125 may be coupled to the exhaust passage 104 downstream of the PF 172. The oxygen sensors 129, 123, and 125 may be linear oxygen sensors or UEGO (universal or wide-range exhaust gas oxygen), two-state oxygen sensors or EGO, HEGO (heated EGO), a NOx, HC, or CO sensors.

During cold-start, expedited heating of the emission control device 170 may be desired to reduce cold start emissions. During a cold-start, engine air fuel ratio may be adjusted such as by one or more of enriching engine air fuel ratio and operating engine cylinders with an air-fuel imbalance, and secondary air may be injected upstream of the emission control device 170 via the air injector 145 to generate an exotherm at the face of the exhaust catalyst. Injecting secondary air flow upstream of the exhaust catalyst may include adjusting an amount of secondary air flow injected upstream of the exhaust catalyst based on a difference between a requested secondary air flow upstream of the exhaust catalyst and a measured air flow upstream of the exhaust catalyst, wherein the requested air flow is estimated as a function of each of a desired engine air fuel ratio, a desired catalyst air fuel ratio, and an engine air mass, and wherein the measured air flow is a function of each of an estimated engine air fuel ratio, an estimated catalyst air fuel ratio, and the engine air mass. The desired engine air fuel ratio may be a function of a catalyst light-off temperature and the desired catalyst air fuel ratio is a function of a number of engine firing events, the catalyst air fuel ratio being the air fuel ratio of exhaust gas reaching the catalyst. A method to attain or maintain a desired TWC temperature is elaborated in FIG. 3.

Particulate filter regeneration may be initiated by heating the filter responsive to soot load at the filter being higher than a threshold load. The filter may be heated to or above a temperature that enables soot particles to be burned at a faster rate than the deposition of new soot particles, for example, to 400-600° C. Due to the distance between the engine and the PF 172, sufficient heat for PF regeneration may not reach the PF from the engine. In one example, filter heating is expedited by operating the engine with one or more of cylinder-to-cylinder air-fuel ratio (AFR) imbalance, enriched engine AFR, and injection secondary air upstream of the PF 172 via air injector 148. Combustion of the secondary air and the fuel present in the exhaust gas may cause an exotherm at the face of the PF 172, thereby increasing PF temperature. An amount of air injected upstream of the PF 172 may be based on a difference between a requested air flow and a measured air flow, wherein the requested air flow is estimated as a function of each of a desired engine air fuel ratio, a desired PF air fuel ratio, and an engine air mass, and wherein the measured air flow is a function of each of an estimated engine air fuel ratio, an estimated PF air fuel ratio, and the engine air mass. Each of the desired engine air fuel ratio and the desired PF air fuel ratio may be based on the second threshold temperature, the PF air fuel ratio being the air fuel ratio of exhaust gas reaching the PF 172.

Operating the engine with a richer than stoichiometric AFR may have a cooling effect on the emission control device 170 coupled to the exhaust passage upstream of the PF 172. In order to maintain the temperature of the emission control device 170 above the light-off temperature, a degree of richness may be adjusted in response to a decrease in catalyst temperature during the richer than stoichiometric engine operation. In one example, the degree of richness may be decreased in response to a higher than threshold rate of decrease in catalyst temperature. A method to attain a desired PF temperature for regeneration is elaborated in FIG. 4.

During conditions when heating of the emission control device 170 and PF 172 is not desired, secondary air flow to the exhaust passage 104 from the air pump 142 may be opportunistically used to cool exhaust components. In alternate embodiments, an additional air injector may be coupled to the exhaust passage 104 upstream of the exhaust turbine 116, and during engine start, secondary exhaust air may be injected upstream of the turbine 116 to expedite turbine spool up.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include, MAP sensor 124, exhaust temperature sensors 128 and 122, exhaust pressure sensor 127, exhaust oxygen sensors 129, 123, and 125, compressor inlet temperature sensor 55, compressor inlet pressure sensor 56, ambient humidity sensor 57, IAT sensor 51, engine coolant temperature sensor, air pump 142, and EGR sensor. Other sensors such as additional pressure, temperature, air/fuel ratio, and composition sensors may be coupled to various locations in engine system 100.

The actuators 18 may include, for example, electric booster bypass valve 161, throttle 20, electric booster actuator 155*b*, EGR valve 152, wastegate valve 91, air injectors 145 and 148, airflow control valves 144 and 146, and fuel injector 66. The control system 14 may include a controller 12. The controller 12 may receive input data from the various sensors, process the input data, and trigger various actuators in response to the processed input data based on instruction or code programmed therein corresponding to one or more routines. In one example, during an engine non-combusting condition, in response to a higher than threshold, the controller may estimate a PM load on the PF 172 via the pressure sensor 127 and a PF temperature via the temperature sensor 122, and in response to each of a higher than threshold PM load on the PF and a lower than threshold PF temperature, controller 12 may send a signal to each of the air pump 142 and the air flow control valve 144 to initiate air pump 142 operation and to actuate the valve 144 to an open position in order to supply secondary air flow upstream of the PF 172. The secondary air flow upon mixing with fuel in the exhaust gas (with engine operated at richer than stoichiometric AFR) may create an exotherm at the face of the PF 172 to increase the PF temperature to the threshold PF temperature.

In some examples, vehicle 102 may be a hybrid vehicle with multiple sources of torque available to one or more vehicle wheels 157. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Crankshaft of engine 10 and electric machine 52 are connected via a transmission 54 to vehicle wheels 157 when one or more clutches 156 are engaged. In the depicted example, a first clutch 156 is provided between crankshaft and electric machine 52, and a second clutch 156 is provided between electric machine 52 and transmission 54. Controller 12 may send a signal to an actuator of each clutch 156 to engage or disengage the clutch, so as to connect or disconnect crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 157. Electric machine 52 may also be operated as a generator to provide electrical power to charge traction battery 58, for example during a braking operation.

In this way, the components of FIG. 1 enable an engine system comprising: a controller with computer readable instructions stored on non-transitory memory to: during a first condition, increasing exhaust temperature upstream of an exhaust catalyst coupled to an exhaust of the engine by enriching an air fuel ratio of an air and fuel mixture combusted by the engine, and/or spark timing of spark delivered to the engine for ignition of the air and fuel mixture, and injecting air upstream of the exhaust catalyst; and during a second condition, increasing exhaust temperature upstream of an exhaust gasoline particulate filter (GPF) by enriching the engine air fuel ratio and injecting air upstream of the exhaust catalyst, while maintaining exhaust catalyst temperature above a first threshold temperature.

Figure 2:
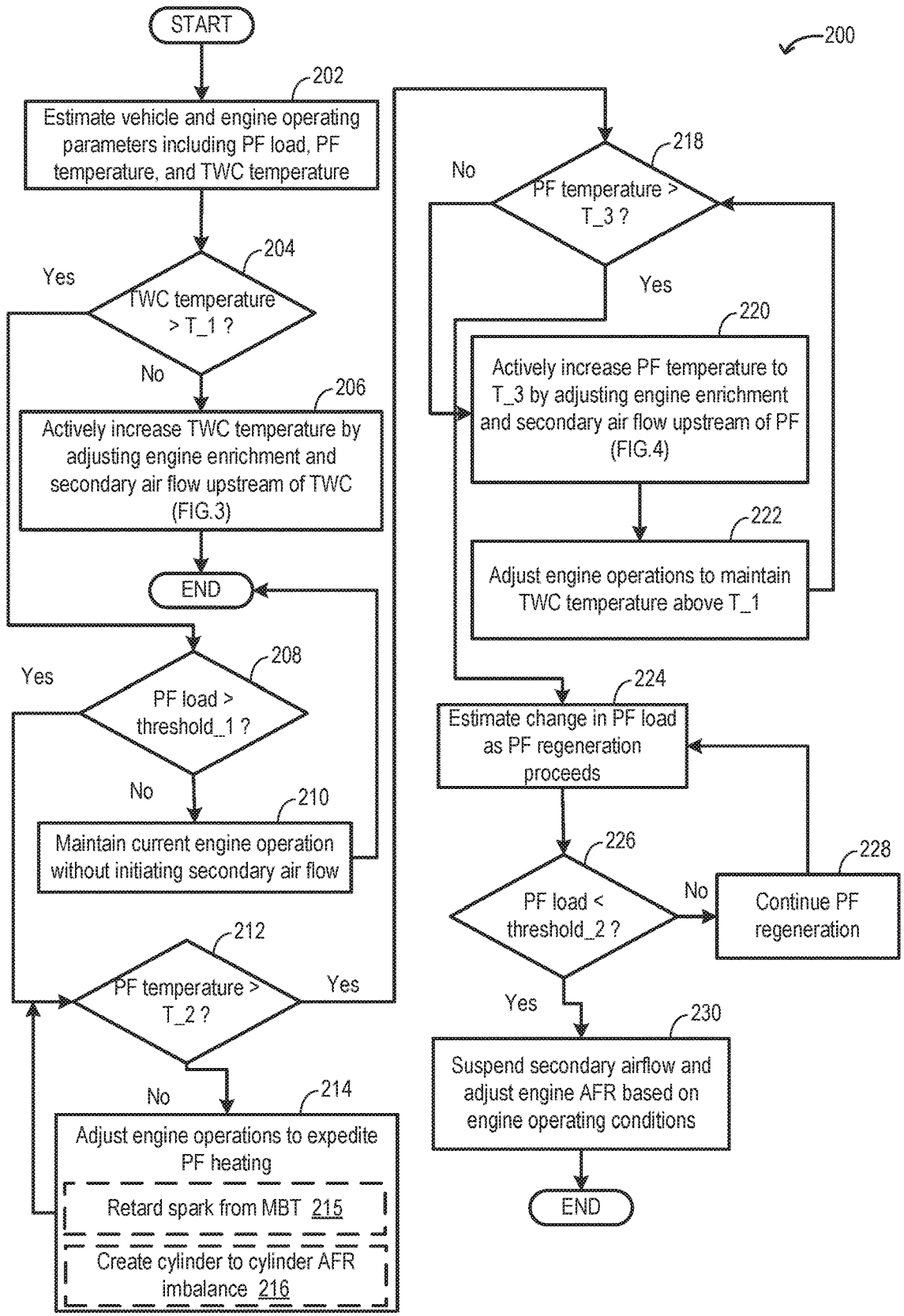
FIG. 2 shows an example flowchart illustrating a high level routine for heating each of the exhaust catalyst and the particulate filter (PF).

Referring now to FIG. 2, an example routine 200 for heating each of an exhaust three-way catalyst (such as emission control device 170 in FIG. 1) and an exhaust particulate filter (such as PF 172 in FIG. 1) coupled to the exhaust passage downstream of the TWC. In the present example, regeneration of a gasoline particulate filter (GPF) is discussed though it will be appreciated that other particulate filter configurations are also possible. Instructions for carrying out routine 200 and the rest of the methods included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, engine operating conditions may be estimated and/or inferred. These may include, for example, engine speed, engine load, driver torque demand, ambient conditions (e.g. ambient temperature and humidity, and barometric pressure), MAP, MAF, MAT, engine temperature, boost level, air-fuel ratio, etc.

A particulate filter (PF) load may be estimated based on engine operating conditions. In particular, PF load may be estimated and tracked by counting a frequency and duration of engine operation in conditions where particulate matter (PMs) may be released. For example, the controller may count a number of engine cold-starts over each drive cycle as well as a time spent in engine cold start conditions, frequency of engine operation with deep enrichment (including a degree of enrichment relative to stoichiometry and a duration of operation with enrichment), frequency of engine operation with compression injection, etc. These values may be accrued. The controller may then subtract from the accrued value periods of lean operation (e.g., leaner than stoichiometry) while the PF is hot (e.g., above a threshold temperature, such as above 600° C.) weighted by the mass of oxygen flowing through the filter. In another example, a soot accumulation model may be utilized to estimate the amount of soot in the particulate filter. In one example, soot accumulation may be modeled as a mass from empirically determined test results. In this model, the amount of soot expelled by an engine at different engine speeds and loads can be stored in a table or function. When the engine is operated, the table may be interrogated based on present engine speed and load to determine the amount of soot directed to a particulate filter of the exhaust system. Likewise, the oxidation rate of soot may be estimated in a similar fashion from engine exhaust oxygen concentration and particulate filter temperature. For example, a table holding oxidation rates of soot may be indexed by particulate filter temperature and mass flow rate of oxygen to the filter. In yet another example, the amount of particulates stored in a particulate filter may be estimated based on a pressure drop across the particulate filter at a given flow rate though the particulate filter. The pressure drop may be monitored via a pressure sensor (such as pressure sensor 127 in FIG. 1) coupled across the PF. The greater the pressure drop, the greater the inferred particulate matter accumulation within the particulate filter. In a further example, the PF load may be detected, by a soot sensor coupled to the particulate filter.

A PF temperature may be estimated based on a first exhaust temperature as measured via a temperature sensor (such as the temperature sensor 122 in FIG. 1) coupled to the exhaust passage upstream of the PF (and downstream of the TWC). PF temperature may be a function of the first exhaust temperature. In one example, the controller may use a look-up table to estimate the PF temperature, the look-up table having the first exhaust temperature as input and PF temperature as output. Similarly, TWC temperature may be estimated based on a second exhaust temperature as measured via a temperature sensor (such as the temperature sensor 128 in FIG. 1) coupled to the exhaust passage upstream of the TWC. TWC temperature may be a function of the first exhaust temperature. In one example, the controller may use a look-up table to estimate the TWC temperature, the look-up table having the first exhaust temperature as input and TWC temperature as output.

At 204, the routine includes determining if the TWC temperature is higher than a first threshold temperature (T_1). The first threshold temperature may correspond to a TWC light-off temperature above which the TWC can catalytically treat the exhaust flow from the engine. In one example, T_1 may be 550° C. If it is determined that TWC temperature is lower than T_1, it may be inferred that the TWC is not yet lit-off, such as during a cold-start, or that the TWC temperature has decreased below the desired light-off temperature.

At 206, the controller may adjust engine enrichment such as by enriching engine AFR or operating engine cylinders with an air-fuel imbalance, and initiate secondary air flow upstream of the TWC. In one example, the controller may send a signal to the air pump coupled to the exhaust air injectors to initiate operation of the pump. Also, the controller may send a signal to the valve (such as control valve 144 in FIG. 1) coupled to an air line supplying air to the air injector (such as injector 145 in FIG. 1) upstream of the TWC to a completely open position such that air may be delivered to the exhaust passage upstream of the TWC. An exotherm caused by the mixing of fuel and air at the face of the TWC may result in expedited light-off. Details of the TWC heating method is discussed in relation to FIG. 3.

If it is determined that the TWC temperature is higher than T_1, it may be inferred that the TWC is lit-off and the TWC is functional in treating the exhaust gas flowing through it. At 208, the routine includes determining if the PF load exceeds a first threshold load (threshold_1) above which exhaust backpressure generated by the loaded filter can adversely affect engine performance. In one example, the threshold load may be set at two grams per liter. If the PF load does not exceed the threshold load, at 210, current engine operation may be maintained and soot in the exhaust gas may be continued to be deposited on the PF. Engine AFR may be maintained at or close to a stoichiometric AFR. Since temperature increase at the TWC and/or PF is not desired, the air pump may be maintained in a deactivated state and secondary airflow to the exhaust passage may be disabled.

If it is determined that PF load is higher than threshold_1, PF regeneration may be desired. In order to initiate regeneration, wherein the soot deposited on the PF is oxidized at an elevated temperature, a higher than threshold exhaust temperature may be desired. Due to the location of the PF, exhaust heat reaching the PF may not be sufficient to increase the PF temperature to above the threshold temperature, and active heating of the PF may be requested.

At 212, the routine includes determining if the PF temperature is higher than a second threshold temperature (T_2). The second threshold temperature may correspond to a temperature at which air and fuel present in the exhaust passage may ignite. For example, it may be determined if the PF temperature is above 127° C. If the PF temperature is lower than T_2, secondary air flow at the face of the PF may not be able to ignite the fuel present in the exhaust gas (caused by engine enrichment or cylinder air-fuel imbalance). Without ignition of the air fuel mixture immediately upstream of the PF, the exotherm capable of increasing PF temperature to a temperature that is sufficient for PF regeneration may not be produced. Therefore, if it is determined that PF temperature is lower than T_2, prior to engaging a method to provide fuel and air (for ignition) in the exhaust passage (immediately upstream of the PF), it may be desired to increase the PF temperature to T_2.

At 214, engine operations may be adjusted to expedite PF heating to temperature T_2. Adjusting engine operations may include, at 215, retarding spark timing from maximum brake torque (MBT) timing. Due to spark retard, combustion efficiency decreases causing an exotherm in the exhaust passage. Heat from the exotherm may travel to the PF via the TWC. Adjusting engine operations may further include, at 216, operating the engine cylinders with cylinder-to-cylinder air-fuel ratio (AFR) imbalance. Operating with AFR imbalance may include operating the engine with a first number of cylinders combusting lean, a second number of cylinders combusting rich, and spark timing retard while maintaining an exhaust air-fuel ratio at stoichiometry. In one example, in order to expedite PF heating, the engine may be operated with simultaneous spark retard and cylinder-to-cylinder AFR imbalance. The spark retard and AFR imbalance may be adjusted based on a temperature deficit of the PF and current mass flow. In one example, the temperature deficit may be estimated by calculating the temperature difference between the current particulate filter temperature (e.g., inferred from sensor 122 of FIG. 1) and the threshold temperature T_2 (such as 127° C.). Further, current mass flow may be estimated from MAF sensor. A look-up table may be indexed based on the temperature deficit and mass air-flow, and may provide an output value for the amount of AFR imbalance to apply. As another example, the controller may make a logical determination for each cylinder (e.g., regarding a duty cycle to be commanded to each cylinder fuel injector) to provide the desired cylinder-to-cylinder AFR imbalance based on logic rules that are a function of the mass flow and the temperature deficit. The controller may then generate a control signal that is sent to each cylinder's fuel injector. In addition, the first number of cylinders (combusting lean) and the second number of cylinders (combusting rich) may also be adjusted based on exhaust temperature (e.g., desired temperature versus measured temperature).

In another example, the amount of imbalance is based on a look-up table derived from mapping data of the exotherm created by each percentage imbalance for a given air mass flow. The deficit (in degrees C.) between the current PF temperature and the threshold temperature T_2 is fed into the table along with current air mass flow. The table then delivers the percent imbalance required to achieve the temperature deficit. In this way, excessive temperatures are not delivered. Additionally, an integral controller term may be added to the imbalance determined to control to a desired temperature using the imbalance amplitude as a control variable.

In one example, the controller may scale the fuel mass by multiplying the fuel mass going into each cylinder by an array indexed by the firing order. Indexing may be based on cylinder firing order. As an example, for a V6 engine configuration (having 6 cylinders arranged as two groups/banks of 3 cylinders), having cylinders 1-3 on a first bank and cylinders 4-6 on a second bank, the firing sequence may be 1-4-2-5-3-6, wherein index 0 is cyl 1, index 1 is cyl 4, etc. The indexing may proceed through the firing order until all cylinders have fired, and then the indexing is repeated. To provide symmetric heating calibration for the V6 engine, the fuel mass multipliers applied for the imbalance generation may be: [1.2, 1.2, 0.9, 0.9, 0.9, 0.9], wherein 1.0 refers to fuel mass at stoichiometry, 0.9 refers to a 10% enleanment, and 1.2 refers to a 20% enrichment. Alternatively, to provide asymmetric heating calibration for the V6 engine, such as to one bank only, the fuel mass multipliers applied for the imbalance generation may be: [1.2, 1.0, 0.9, 1.0, 0.9, 1.0], wherein 1.0 refers to fuel mass at stoichiometry, 0.9 refers to a 10% enleanment, and 1.2 refers to a 20% enrichment. As another example, for an I4 engine configuration (having 4 cylinders arranged in-line), having cylinders 1-4, the firing sequence may be 1-3-4-2, the heating calibration may include fuel mass multipliers: [0.8, 1.2, 0.8, 1.2], wherein 1.0 refers to fuel mass at stoichiometry, 0.8 refers to a 20% enleanment, and 1.2 refers to a 20% enrichment. The sum of the deviations from 1 may be arranged such that they equal 0, or equivalently, the sum of the factors equals the number of cylinders. As a result, the overall air-fuel ratio is maintained around stoichiometry even after applying the cylinder-to-cylinder imbalance.

As an example, adjusting engine operations for PF heating to temperature T_2 may also include operating the engine at a richer than stoichiometric AFR. The amount of enrichment may be based on a look-up table derived from mapping data of the exotherm created by an amount of enrichment for a given air mass flow. The deficit (in degrees C.) between the current PF temperature and the threshold temperature T_2 is fed into the table along with current air mass flow. The table then delivers the amount of enrichment required to achieve the temperature deficit. If it is determined that PF temperature is higher than T_2, the routine may proceed to 218, wherein it may be determined if the PF temperature is above a third threshold temperature (T_3) above which PF regeneration can be initiated. For example, it may be determined if the PF temperature is above 600° C.

If it is determined that the PF temperature is lower than T_3, at 220, the controller may further adjust engine enrichment such as by enriching engine AFR or operating engine cylinders with an air-fuel imbalance, and initiate secondary air flow upstream of the PF. In one example, the controller may send a signal to the air pump coupled to the exhaust air injectors to initiate operation of the pump. Also, the controller may send a signal to a first valve (such as first control valve 146 in FIG. 0.1) coupled to an air line supplying air to a first air injector (such as first injector 148 in FIG. 1) upstream of the PF to a completely open position such that air may be delivered to the exhaust passage upstream of the PF. An exotherm caused by the mixing of fuel and air at the face of the PF may result in an increase in PF temperature to above T_3. Details of the PF heating method is discussed in relation to FIG. 4.

At 222, during active heating of the PF, engine operations may be continually adjusted to maintain TWC temperature above T_1. Due to enrichment of engine AFR and supply of air downstream of the TWC, there may be a cooling effect at the TWC. Engine heat may be proportioned between the TWC and the PF in a way such that TWC temperature may be maintained above T_1 while PF is being heated to T_3. TWC temperature may be estimated via the exhaust temperature sensor coupled to the exhaust passage upstream of the TWC. As an example, if it is observed that during heating the PF, even if the TWC temperature remains above T_1 but the TWC temperature reduces at a higher than threshold rate (such as 5% per minute), adjustments to engine AFR and/or secondary air injection upstream of the PF/TWC may be carried out to inhibit further decrease in TWC temperature. Also, adjustments to engine AFR and/or secondary air injection in response to the TWC temperature reducing to below a first TWC temperature, the first TWC temperature being higher than the TWC light-off temperature.

In one example, the AFR imbalance may be adjusted to inhibit further decrease in TWC temperature. The controller may reduce or limit the amplitude of the AFR imbalance modulation. For example, the controller may reduce the amplitude of the AFR imbalance from 20% enleanment/enrichment to 10% enleanment/enrichment. Also, the AFR imbalance may be reduced or limited responsive to a temperature at the TWC reducing to a temperature below which catalyst functionality may be adversely affected.

In another example, the level of richness may be adjusted to decrease TWC cooling. The controller may reduce the engine AFR from 0.8 to 0.9. In yet another example, the controller may open a second control valve (such as second control valve 144 in FIG. 2) coupled to a second air line (such as second air line 143) to regulate secondary air flow from the air pump to the second air injector (such as second air injector 145 in FIG. 2) coupled to the exhaust passage upstream of the TWC. By introducing a secondary air flow upstream of the TWC, fuel in the exhaust may partly combust at the face of the TWC, thereby increasing the TWC temperature. As an example, the controller may adjust the amount of secondary air flow upstream of the TWC (by adjusting an opening of the second control valve) based on a difference between the TWC temperature and a target temperature (such as T_1), the amount of air flow increasing with an increase in the difference and the amount of air flow decreasing with a decrease in the difference.

In yet another example, in order to mitigate the cooling effect of engine AFR adjustments and secondary air injection, spark timing may be retarded from MBT to increase exhaust heat upstream of the TWC. The controller may estimate the amount of spark retard using a look-up table with the readings from the exhaust temperature sensor coupled to the exhaust passage upstream of the TWC as input and the spark timing the output. The controller may estimate a fuel penalty caused by operating the engine with spark retard or AFR adjustments (to mitigate TWC cooling) and may employ the most fuel efficient method to maintain TWC temperature above its light-off temperature while heating the PF.

In this way, catalyst temperature may be maintained above the light-off temperature by adjusting a level of richness based on each of the estimated catalyst temperature, the estimated PF temperature, a first threshold temperature (or light-off temperature), and the PF regeneration temperature.

If it is determined at 218 that the PF temperature is higher than the threshold T_3, in presence of oxygen, soot deposited on the PF may be oxidized. At 224, change in PF soot load may be estimated based on a change in exhaust pressure. At 226, the routine includes determining if the PF load has reduced to below a second threshold (threshold_2) load. Threshold_2 may be calibrated based on exhaust back pressure and the threshold_2 soot load may correspond to a soot load level at which the corresponding exhaust back pressure may not adversely affect engine operations. Also, below the threshold_2 soot load, the filtering capability of the PF may be adversely affected. Therefore, it may not be desired to remove any further soot from the PF once PF load reaches threshold_2. Therefore, if it is determined that the PF load has reached threshold_2, at 230, the controller may suspend secondary airflow upstream of the PF by sending a signal to the air pump to suspend pump operation. Also, the first control valve may be actuated to a closed position. Engine AFR may no longer be enriched and cylinder-to-cylinder imbalance may no longer be desired. In one example, stoichiometric engine operation may be resumed. PF load estimate at the end of the regeneration and the PF regeneration history may be updated in the controller's memory.

In this way, the PF may be heated by adjustment of engine AFR and secondary air injection in response to the PF having each of a higher than threshold particulate matter load, a higher than threshold second temperature, and a lower than threshold third temperature. The second threshold temperature being an oxidation temperature of particulate matter deposited on the PF and the third threshold temperature being an ignition temperature of air and fuel in the exhaust passage upstream of the PF.

Figure 3:
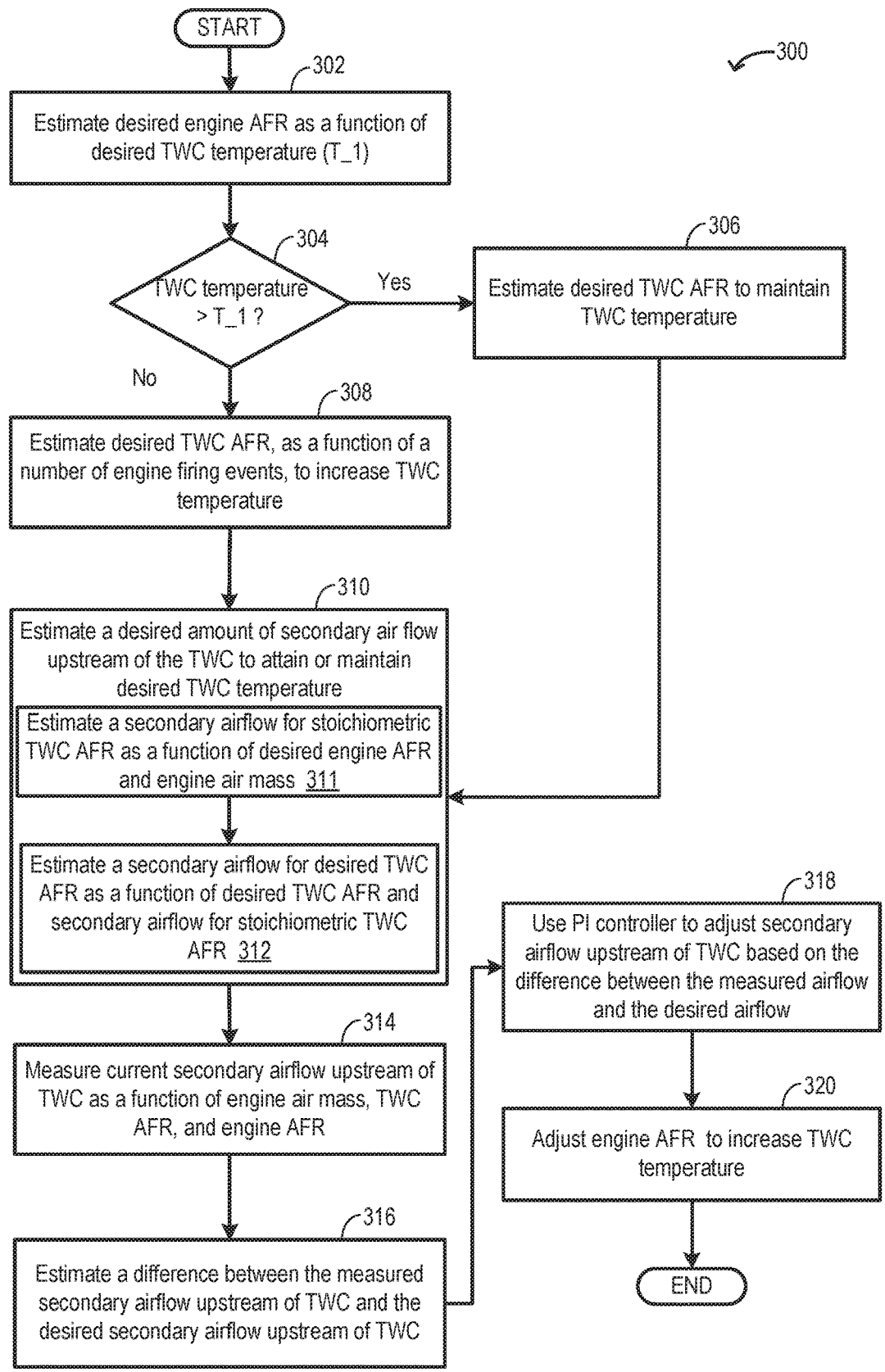
FIG. 3 shows an example flowchart illustrating a method for heating the exhaust catalyst to attain catalyst light-off.

FIG. 3 shows an example method 300 for heating an exhaust three-way catalyst (such as emission control device 170 in FIG. 1). Method 300 may be part of method 200, as described in FIG. 2, and may be carried out at step 206 of method 200.

At 302, the routine includes estimating an engine air fuel ratio (AFR) corresponding to a desired TWC temperature. In one example, the engine AFR may be enriched to maintain a desired TWC temperature. Richer than stoichiometric AFR may cause the excess fuel (unburnt in cylinder combustion) in the exhaust passage to burn in the exhaust passage, at the face of the TWC, thereby increasing TWC temperature. The engine AFR may be estimated as a function of the desired TWC temperature. The desired TWC temperature may be the first threshold temperature T_1 (as defined in step 204 of method 200) corresponding to the TWC light-off temperature. As an example, the desired engine AFR may be 0.8 to attain and/or maintain a TWC temperature of 550° C. By operating the engine at the estimated desired engine AR, the TWC temperature may increase and remain at or above T_1.

At 304, the routine includes determining if the TWC temperature is higher than the threshold temperature, T_1. If it is determined that TWC temperature is lower than T_1, such as during a cold-start, since the TWC is not yet lit-off, there may be a possibility of NOx break through. A leaner than stoichiometric AFR may be desired at the TWC to suppress the NOx break through even during cold-starts. At 308, the controller may estimate a desired AFR at the TWC (referenced herein as TWC AFR) corresponding to the desired TWC temperature. In one example, during cold start conditions, the TWC AFR may be a function of the number of engine firing events. As an example, during the first few engine firing events, TWC AFR may be desired to be leaner than stoichiometric (such as 1.03) to reduce NOx break through. After a threshold duration, the TWC AFR may be gradually increased to stoichiometric AFR when the possibility of NOx break through reduces. In one example, the threshold duration may be 20 seconds since the first firing event.

At 310, a desired amount of secondary air flow upstream of the TWC may be estimated to attain or maintain the desired TWC temperature. In the presence of the secondary airflow, fuel present in the exhaust gas may burn at the face of the TWC, thereby increasing TWC temperature. If at 304 it is determined that TWC temperature is higher than T_1, the routine may still proceed to step 310 to estimate the desired amount of secondary air flow to maintain TWC temperature.

Estimating the desired amount of secondary air flow upstream of the TWC may include at 311, estimating a desired amount of secondary air flow upstream of the TWC for attaining a stoichiometric AFR at the TWC. The estimated amount of secondary air flow upstream of the TWC for attaining a stoichiometric AFR at the TWC may be a function of a desired engine AFR ($E1_{AFR}$) as estimated in step 302 and engine air mass. Engine air mass ($E_{airmass}$) may be estimated via a mass air flow (MAF) sensor or a manifold air pressure (MAP) sensor coupled to the engine intake manifold. In one example, the desired amount of secondary air flow upstream of the TWC for attaining a stoichiometric AFR at the TWC ($A_1$) may be estimated based on equation 1.

$$A_1 = (1 - E1_{AFR}) \times E_{airmass} \qquad (1)$$

Estimating the desired amount of secondary air flow upstream of the TWC to attain or maintain the desired TWC temperature may include, at 312, estimating the desired amount of secondary air flow based on the desired TWC AFR ($C1_{AFR}$, as estimated in step 308) and the amount of secondary air flow upstream of the TWC for attaining a stoichiometric AFR at the TWC ($A_1$) as estimated in step 311. In one example, the desired amount of secondary air flow upstream of the TWC for attaining the desired AFR at the TWC ($A_2$) may be estimated based on equation 2.

$$A_2 = A_1 \times C1_{AFR} \quad (2)$$

At 314, a current secondary airflow upstream of the TWC may be estimated as a function of engine air mass, current TWC AFR ($C2_{AFR}$), and current engine AFR ($E2_{AFR}$). In one example, the controller may measure current TWC AFR ($C2_{AFR}$) based on readings from each of an oxygen sensor coupled to the exhaust passage upstream of the TWC (such as first exhaust oxygen sensor 129) and an oxygen sensor coupled to the exhaust passage downstream of the TWC (such as second exhaust oxygen sensor 123). The controller may estimate the current TWC AFR using a look-up table with the readings from each of the oxygen sensor coupled to the exhaust passage upstream of the TWC and the oxygen sensor coupled downstream of the TWC as inputs and the TWC AFR as the output. In another example, current engine AFR ($E2_{AFR}$) may be estimated by the controller based on inputs from the oxygen sensor coupled to the exhaust passage upstream of the TWC. The controller may estimate the current engine AFR using a look-up table with the readings from the oxygen sensor coupled to the exhaust passage upstream of the TWC as input and the current engine AFR as output. The current secondary airflow ($A_c$) upstream of the TWC may be estimated by equation 3.

$$A_C = E_{airmass} \times \left[ \left( \frac{C2_{AFR}}{E2_{AFR}} \right) - 1 \right] \quad (3)$$

At 316, a difference between the measured secondary airflow ($A_c$) upstream of the TWC and the desired secondary airflow upstream of the TWC ($A_2$) may be estimated.

At 318, a proportional-integral controller may be used to close loop control the secondary airflow upstream of the TWC. The pump speed may be continually based on the difference between the measured secondary airflow ($A_c$) upstream of the TWC and the desired secondary airflow upstream of the TWC ($A_2$). In one example, if the measured secondary airflow is lower than the desired secondary airflow, the air pump duty cycle may be increased to increase the secondary air supply until the measured airflow becomes equal to the desired airflow. In another example, if the measured secondary airflow is higher than the desired secondary airflow, the air pump speed may be decreased until the measured airflow becomes equal to the desired airflow.

At 320, engine AFR may be adjusted to increase the TWC temperature to the desired temperature. In one example, excess fuel may be injected such that the fuel when in contact with the secondary air injected upstream of the TWC creates an exotherm at the face of the TWC. However, excess (unburnt) fuel flowing through the TWC may bring about a cooling effect. Therefore, the amount of excess fuel in the exhaust may be estimated based on amount of secondary airflow upstream of the TWC such that the entire fuel is combusted with the secondary airflow and the TWC temperature may increase to T_1. A look-up table may be indexed based on the secondary air flow, and may provide an output value for the amount of fuel richness to apply. As another example, the controller may make a logical determination for each cylinder (e.g., regarding a duty cycle to be commanded to each cylinder fuel injector) to provide the desired richer than stoichiometric engine AFR based on logic rules that are a function of the secondary air flow and TWC temperature. The controller may then generate a control signal that is sent to each cylinder's fuel injector. In this way, by coordinating secondary airflow and engine AFR, TWC heating may be expedited.

In this way, exhaust gases may be routed from an engine through an exhaust catalyst and then through a gasoline particulate filter (GPF); prior to exhaust catalyst light-off, engine air fuel ratio may be adjusted and secondary air flow may be injected upstream of the exhaust catalyst; and after the exhaust catalyst light-off, in response to each of a higher than threshold particulate matter load on the GPF, and a lower than threshold GPF temperature, the engine air fuel ratio may be adjusted and secondary air flow may be injected upstream of the GPF to regenerate the GPF while maintaining the exhaust catalyst above a light-off temperature.

Figure 4:
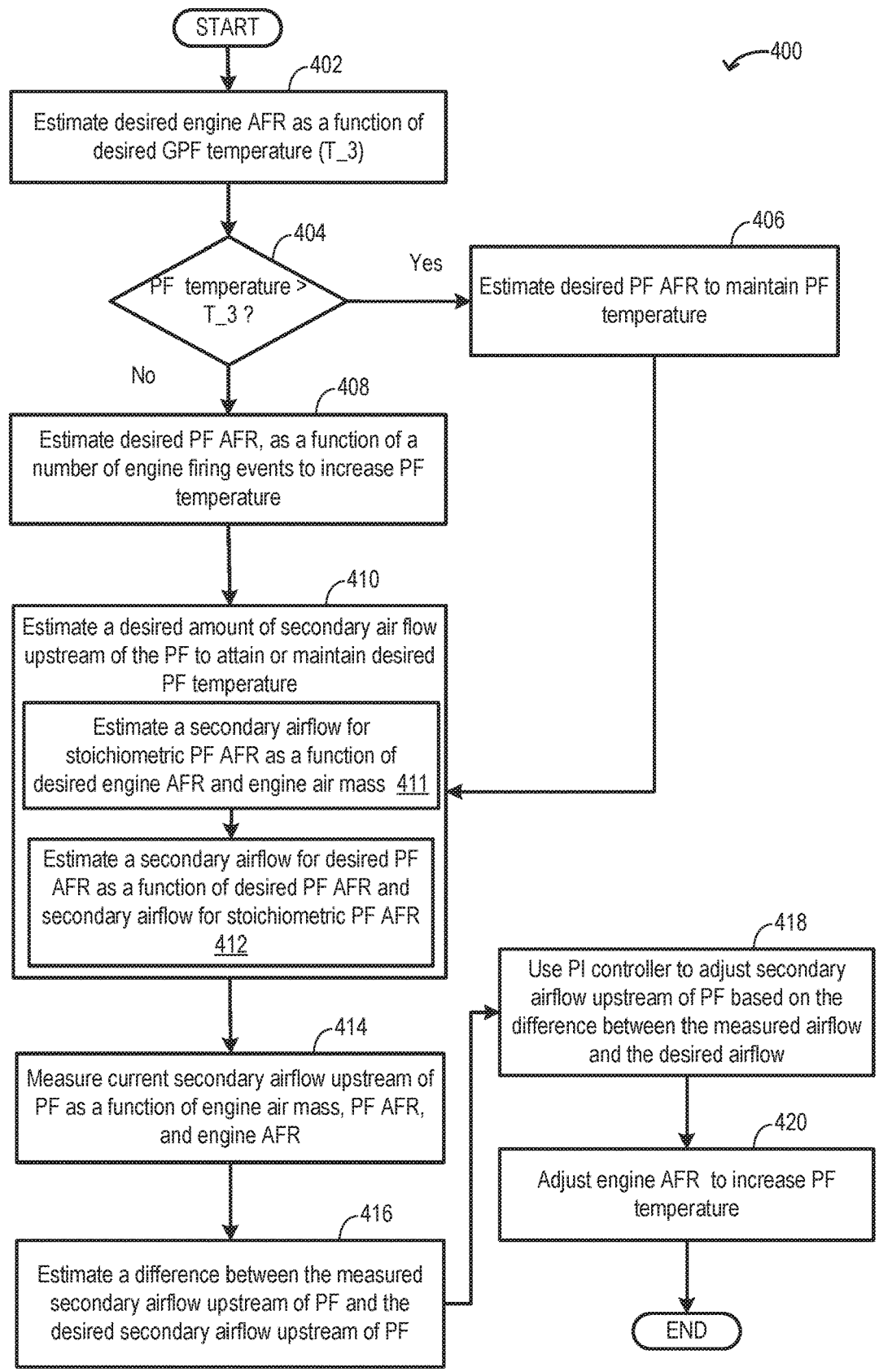
FIG. 4 shows an example flowchart illustrating a method for heating the PF to initiate PF regeneration.
Figure 5:
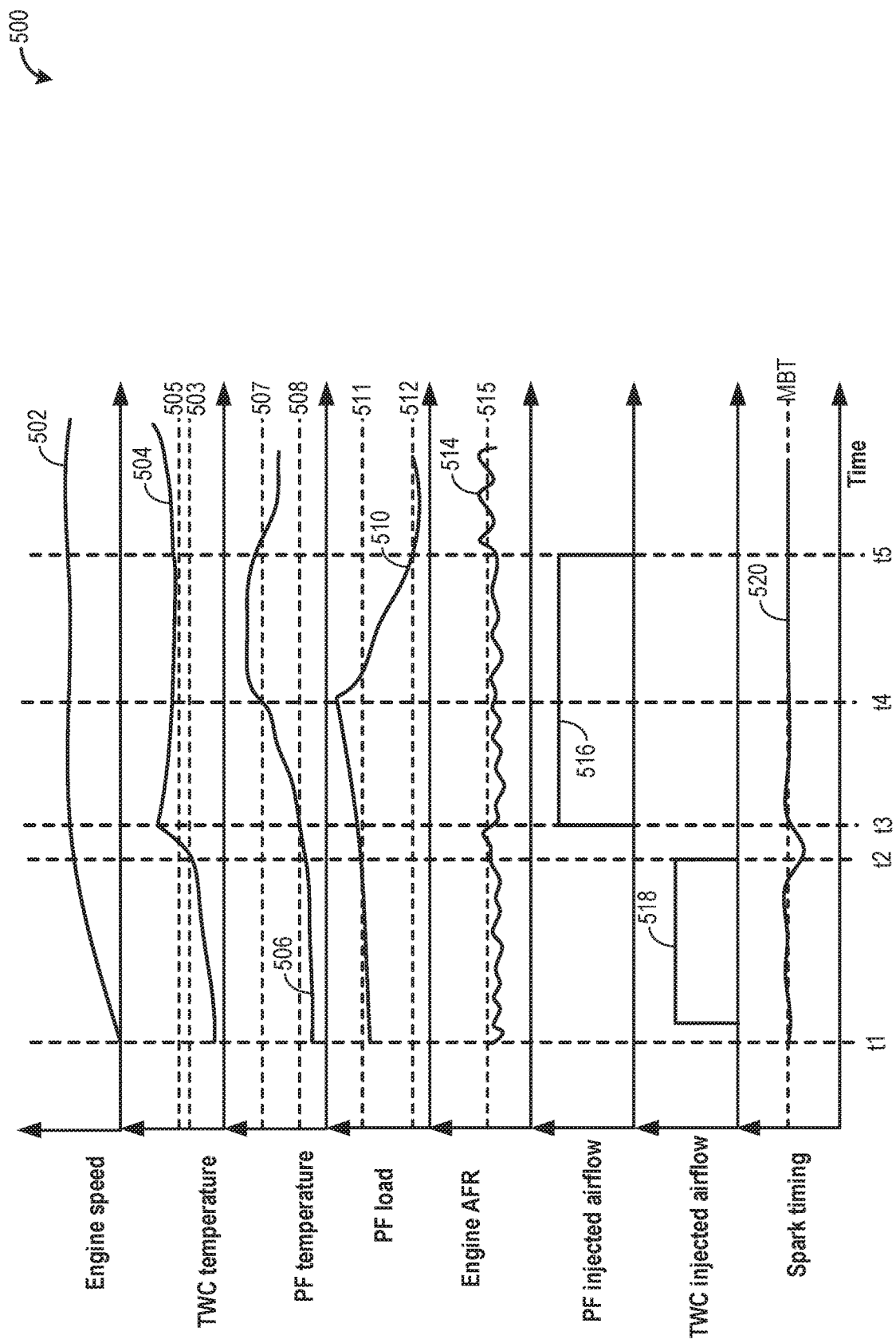
FIG. 5 shows an example heating process for each of the exhaust catalyst and the PF.

FIG. 4 shows an example method 400 for heating an exhaust particulate filter (such as PF 172 in FIG. 1) for regeneration. Method 400 may be part of method 200, as described in FIG. 2, and may be carried out at step 220 of method 200.

At 402, the routine includes estimating an engine air fuel ratio (AFR) corresponding to a desired PF temperature. In one example, the engine AFR may be enriched to attain a desired PF temperature. Richer than stoichiometric AFR may cause uncombusted fuel from the cylinders to enter the exhaust passage and burning of the fuel in the exhaust passage may provide heat for increasing PF temperature. The engine AFR may be estimated as a function of the desired PF temperature. The desired PF temperature may be the third threshold temperature T_3 (as defined in step 218 of method 200) corresponding to the PF regeneration temperature. As an example, the desired engine AFR may be 0.85 to attain and maintain a PF temperature of 600° C. By operating the engine at the estimated desired engine AR, the PF temperature may increase.

At 404, the routine includes determining if the PF temperature is higher than the threshold temperature, T_3. If it is determined that PF temperature is lower than T_3, PF heating may be desired in order to start burning the soot particles deposited on the PF. At 408, the controller may estimate a desired AFR at the PF (referenced herein as PF AFR) corresponding to the desired PF temperature. PF AFR may be defined as the AFR at the face of the PF and PF AFR may be different from the engine AFR. In the presence of the desired PF AFR, the temperature of the PF may be increased. As an example, as exhaust flows through the catalyst upstream of the PF, fuel in the exhaust may burn in the exhaust passage causing an increase in catalyst temperature. In this way, the AFR of exhaust released from the engine cylinders may be different from the AFR of exhaust reaching the PF. In one example, PF bricks may be coated to treat any NOx and HC remaining in the exhaust gas flowing through the PF. During a first few engine cycles following an engine cold start, in order to reduce the NOx and HC break through, PF AFR may be desired to be leaner than stoichiometric. After a threshold duration, the PF AFR may be gradually increased to stoichiometric AFR when the possibility of NOx break through reduces. In one example, the threshold duration may be 20 seconds since the first firing event.

At 410, a desired amount of secondary air flow upstream of the PF may be estimated to attain or maintain the desired PF temperature during PF regeneration. In the presence of the secondary airflow, fuel present in the exhaust gas may burn at the face of the PF, thereby increasing PF temperature. If at 404 it is determined that PF temperature is higher than T_3, the routine may still proceed to step 410 to estimate the desired amount of secondary air flow to maintain PF temperature during the regeneration process.

Estimating the desired amount of secondary air flow upstream of the PF may include at 411, estimating a desired amount of secondary air flow upstream of the PF for attaining a stoichiometric AFR at the PF. The estimated amount of secondary air flow upstream of the PF for attaining a stoichiometric AFR at the PF may be a function of a desired engine AFR (S/AFR) as estimated in step 402 and engine air mass. Engine air mass ($E_{airmass}$) may be estimated via a mass air flow (MAF) sensor or a manifold air pressure (MAP) sensor coupled to the engine intake manifold. In one example, the desired amount of secondary air flow upstream of the PF for attaining a stoichiometric AFR at the PF ($P_1$) may be estimated based on equation 4.

$$P_1 = (1 - S1_{AFR}) \times E_{airmass} \quad (4)$$

Estimating the desired amount of secondary air flow upstream of the PF to attain or maintain the desired PF regeneration temperature may include, at 412, estimating the desired amount of secondary air flow based on the desired PF AFR ($F1_{AFR}$, as estimated in step 408) and the amount of secondary air flow upstream of the TWC for attaining a stoichiometric AFR at the TWC ($P_1$) as estimated in step 411. In one example, the desired amount of secondary air flow upstream of the TWC for attaining the desired AFR at the TWC ($P_2$) may be estimated based on equation 5.

$$P_2 = P_1 \times F1_{AFR} \quad (5)$$

At 414, a current secondary airflow upstream of the TWC may be estimated as a function of engine air mass, current PF AFR ($F2_{AFR}$), and current engine AFR ($E2_{AFR}$). In one example, the controller may measure current PF AFR ($F2_{AFR}$) based on readings from each of an oxygen sensor coupled to the exhaust passage upstream of the PF (such as second exhaust oxygen sensor 123) and an oxygen sensor coupled to the exhaust passage downstream of the PF (such as third exhaust oxygen sensor 125). The controller may estimate the current PF AFR using a look-up table with the readings from each of the oxygen sensor coupled to the exhaust passage upstream of the PF and the oxygen sensor coupled downstream of the PF as inputs and the PF AFR as the output. In another example, current engine AFR ($E2_{AFR}$) may be estimated by the controller based on inputs from the oxygen sensor coupled to the exhaust passage upstream of the exhaust catalyst (TWC). The controller may estimate the current engine AFR using a look-up table with the readings from the oxygen sensor coupled to the exhaust passage upstream of the TWC as input and the current engine AFR as output. The current secondary airflow ($A_f$) upstream of the PF may be estimated by equation 6.

$$A_f = E_{airmass} \times \left[ \left( \frac{F2_{AFR}}{E2_{AFR}} \right) - 1 \right] \quad (6)$$

At 416, a difference between the measured secondary airflow ($A_f$) upstream of the PF and the desired secondary airflow upstream of the PF ($P_2$) may be estimated.

At 418, a proportional-integral controller may be used to close loop control the secondary airflow upstream of the PF. The pump speed may be continually adjust pump speed based on the difference between the measured secondary airflow ($A_f$) upstream of the PF and the desired secondary airflow upstream of the PF ($P_2$). In one example, if the measured secondary airflow is lower than the desired secondary airflow, the air pump duty cycle may be increased to increase the secondary air supply until the measured airflow becomes equal to the desired airflow. In another example, if the measured secondary airflow is higher than the desired secondary airflow, the air pump speed may be decreased until the measured airflow becomes equal to the desired airflow.

At 420, engine PF may be adjusted to increase the PF temperature to the desired temperature. In one example, excess fuel may be injected such that the fuel when in contact with the secondary air injected upstream of the PF creates an exotherm at the face of the PF. However, excess (unburnt) fuel flowing through the TWC may bring about a cooling effect. As described in step 222, engine operations may be adjusted to maintain TWC temperature above its light-off temperature. A look-up table may be indexed based on the secondary air flow, and may provide an output value for the amount of fuel richness to apply for combustion of the amount of secondary airflow injected upstream of the PF. As another example, the controller may make a logical determination for each cylinder (e.g., regarding a duty cycle to be commanded to each cylinder fuel injector) to provide the desired richer than stoichiometric engine AFR based on logic rules that are a function of the secondary air flow, PF temperature, and TWC temperature. The controller may then generate a control signal that is sent to each cylinder's fuel injector. In this way, by coordinating secondary airflow and engine AFR, PF heating may be expedited for PF regeneration.

FIG. 5 shows an example operating sequence 500 illustrating example heating process for each of an exhaust three-way catalyst (such as exhaust after-treatment device 170 in FIG. 1) and an exhaust particulate filter (such as particulate filter 172 in FIG. 1). The horizontal (x-axis) denotes time and the vertical markers t1-t5 identify significant times in engine operation for three-way catalyst (TWC) heating and particulate filter (PF) regeneration.

The first plot, line 502, shows a speed of operation of an engine including the TWC and the PF. The second plot, line 504, shows a temperature of the TWC as estimated based on inputs from an exhaust temperature sensor coupled to the exhaust passage upstream of the TWC. Dashed line 503 shows a TWC light-off temperature below which the TWC is unable to catalytically treat the exhaust gas flowing through the TWC. Dashed line 505 shows a threshold temperature below which engine air fuel ratio is adjusted to compensate for a cooling effect caused due to operating the engine with a richer than stoichiometric air fuel ratio. The third plot, line 506, shows a temperature of the PF as estimated via an exhaust temperature sensor coupled to the exhaust passage upstream of the PF. Dashed line 507 shows a first threshold temperature above which PF regeneration can be initiated. Dashed line 508 shows a second threshold temperature at which air and fuel present in the exhaust passage may ignite. The fourth plot, line 510, shows an amount of soot load accumulated on the PF as estimated based on a pressure drop across the PF measured via a differential pressure sensor coupled across the PF. Dashed line 511 denotes an upper threshold load above which the PF is desired to be regenerated and the dashed line 512 denotes a lower threshold load at which the regeneration may be discontinued. The upper threshold 511 may be calibrated based on exhaust back pressure which may negatively influence engine efficiency. The lower threshold 512 may be calibrated based on exhaust back pressure which may no longer adversely affect engine performance. The fifth plot, line 514, shows a variation in engine air fuel ratio over time. Dashed line 515 corresponds to a stoichiometric air fuel ratio. The sixth plot, line 516, shows secondary air flow injected upstream of the PF via a first air injector coupled to an air pump via a first control valve. The seventh plot, line 518, shows secondary air flow injected upstream of the TWC via a second air injector coupled to the air pump via a second control valve. The eighth plot, line 520, shows spark timing relative to maximum brake torque (MBT) timing.

Prior to time t1, the engine is at rest with fuel injection and spark enabled. Secondary air is not injected upstream of the TWC and/or the PF. At time t1, the engine is started from rest and due to cold-start conditions, the TWC temperature is below the light-off temperature 503. In order to expedite TWC heat up, the controller sends a signal to actuate the air pump supplying air upstream of the TWC. The controller also sends a signal to the control valve coupled to the air line supplying air upstream of the TWC to completely open the control valve. Between time t1 and t2, the engine is operated with a richer than stoichiometric AFR. The uncombusted fuel escaping the cylinders upon combining with the secondary air injected upstream of the TWC creates an exotherm at the face of the TWC. Due to the presence of the exotherm, TWC temperature increases steadily. During this time (between t1 and t2), PF load, although increasing, remains below the upper threshold 511.

At time t2, in response to the TWC temperature increasing to above the light-off temperature, the controller sends a signal to the air pump actuator to suspend pump operation. The engine AFR is no longer enriched and a stoichiometric AFR may be maintained. Also, at time t2, PF load increases to above the upper threshold load 511. However, since the PF temperature is below each of the first threshold temperature 507 and the second threshold temperature 508, PF regeneration does not start. Below the second threshold temperature 508, the PF temperature is not sufficient for combustion of fuel and air at the face of the PF. Therefore, between time t2 and t3, in order to expedite PF heating, spark timing is retarded from MBT. Due to the spark retard, combustion efficiency decreases causing an exotherm in the exhaust passage and heat from the exotherm travels to the PF via the TWC.

At time t3, in response to the PF temperature increasing to above the second threshold temperature 508, active heating of the PF by combustion of fuel and air at the face of the PF is initiated. The controller sends a signal to actuate the air pump supplying air. Also, the controller sends a signal to the control valve coupled to the air line supplying air upstream of the PF to actuate the control valve to an open position. Between time t3 and t4, the engine is operated with a richer than stoichiometric AFR. The uncombusted fuel in the exhaust gas upon combining with the secondary air injected upstream of the PF creates an exotherm at the face of the PF. Due to the presence of the exotherm, PF temperature increases steadily.

At time t4, the PF temperature reaches the first threshold temperature 507 and in the presence of oxygen from the secondary airflow, the soot accumulated on the PF is oxidized. Between time t4 and t5, the PF soot load steadily decreases. Between time t3 and t5, due to the richness from the engine, the TWC temperature decreases. However, since the TWC temperature remains above the threshold 505, engine AFR is not further adjusted and spark timing is maintained at MBT. In one example, if the TWC temperature would have reduced to below the threshold 505, the degree of richness may be reduced and/or spark timing may be retarded from MBT to create an exotherm at the face of the TWC until the TWC temperature would have increased to threshold temperature 505.

At time t5, in response to the PF load decreasing to below the lower threshold 512 it is inferred that PF regeneration is complete and further oxidation of soot is no longer desired. Therefore, the controller sends a signal to the air pump actuator to suspend operation of the air pump. As the secondary air flow via the PF stops, the availability of oxygen decreases and PF regeneration is suspended. Also, after time t5 engine AFR is no longer enriched and a stoichiometric AFR may be maintained.

In this way, by selectively supplying air upstream of an exhaust catalyst and/or an exhaust particulate filter, heating of the catalyst and/or the PF may be expedited. By adjusting an amount of air injection via closed loop control, a desired amount of air may be supplied to light-off the catalyst during a cold start. The technical effect of continually adjusting engine AFR during PF heating is that a cooling effect of the airflow on the exhaust catalyst coupled to the exhaust passage upstream of the PF may be mitigated and the catalyst temperature may be maintained at above its light-off temperature. By proportionately distributing engine heat between the catalyst and the PF, a desired temperature profile of each of the catalyst and the PF may be obtained during different engine operating conditions.

An example engine method comprises: routing exhaust gases from an engine through a three-way catalyst (TWC) and then through a gasoline particulate filter (GPF), controlling enrichment of the engine exhaust gases to be overall richer than stoichiometry at the GPF, injecting air into the GPF to create an exotherm with the enriched exhaust gases entering the GPF, and controlling a degree of the enrichment to reduce any induced cooling of the TWC caused by the enrichment. In any preceding example, additionally or optionally, the injecting air into the GPF is from an air pump via a first air passage and a first air injector, the first air passage including a first control valve. In any or all of the preceding examples, additionally or optionally, creation of the exotherm is in response to the GPF having each of a higher than threshold particulate matter load, a higher than first threshold temperature, and a lower than second threshold temperature. In any or all of the preceding examples, additionally or optionally, the first threshold temperature is an oxidation temperature of particulate matter deposited on the GPF and the second threshold temperature is an ignition temperature of air and fuel in the exhaust passage upstream of the GPF. In any or all of the preceding examples, the method further comprising, additionally or optionally, in response to the PF having each of a higher than threshold particulate matter load and a lower than first threshold temperature, one or more of retarding spark of engine ignition timing from maximum brake torque timing and operating engine cylinders with cylinder-to-cylinder air-fuel imbalance until PF temperature reaches the first threshold temperature, the imbalance adjusted to maintain an overall stoichiometric exhaust air-fuel ratio. In any or all of the preceding examples, additionally or optionally, operating engine cylinders with cylinder-to-cylinder air-fuel imbalance includes operating a first set of cylinders at richer than stoichiometry while operating a second set of cylinders at leaner than stoichiometry, a number of cylinders in each of the first set and the second set based on each of a difference between a measured particulate filter temperature and the first threshold temperature, and a measured mass air flow. In any or all of the preceding examples, additionally or optionally, the degree of the enrichment is adjusted in response to a decrease in TWC temperature during the enrichment of the engine exhaust gases, the degree of enrichment decreased in response to a higher than threshold rate of decrease in TWC temperature. In any or all of the preceding examples, the method further comprising, additionally or optionally, adjusting an amount of air injected upstream of the GPF based on a difference between a requested air flow and a measured air flow, wherein the requested air flow is estimated as a function of each of a desired engine air fuel ratio, a desired GPF air fuel ratio, and an engine air mass, and wherein the measured air flow is a function of each of an estimated engine air fuel ratio, an estimated GPF air fuel ratio, and the engine air mass. In any or all of the preceding examples, additionally or optionally, the adjusting the amount of air injected upstream of the GPF includes adjusting a duty cycle of the exhaust air injection pump and/or adjusting an opening of the first control valve, the duty cycle of the exhaust air injection pump increased and/or the opening of the first control valve increased in response to an increase in a difference between the requested air flow and the measured air flow. In any or all of the preceding examples, additionally or optionally, each of the desired engine air fuel ratio and the desired GPF air fuel ratio is based on the second threshold temperature, the GPF air fuel ratio being the air fuel ratio of exhaust gas reaching the GPF. In any or all of the preceding examples, the method further comprising, additionally or optionally, during cold-start conditions, operating the engine with richer than stoichiometry air fuel ratio and/or operating engine cylinders with cylinder-to-cylinder air-fuel imbalance while injecting air to the exhaust passage upstream of the TWC via a second air injector coupled to a second air passage, the second air passage including a second control valve.

Another example method comprises: routing exhaust gases from an engine through an exhaust catalyst and then through a gasoline particulate filter (GPF), prior to exhaust catalyst light-off, adjusting engine air fuel ratio and injecting secondary air flow upstream of the exhaust catalyst, and after the exhaust catalyst light-off, in response to each of a higher than threshold particulate matter load on the GPF, and a lower than threshold GPF temperature, adjusting the engine air fuel ratio and injecting secondary air flow upstream of the GPF to regenerate the GPF while maintaining the exhaust catalyst above a light-off temperature. In any preceding example, additionally or optionally, the adjusting engine air fuel ratio includes one or more of enriching engine air fuel ratio and operating engine cylinders with an air-fuel imbalance. In any or all of the preceding examples, additionally or optionally, the maintenance of the exhaust catalyst temperature above the light-off temperature includes one or more of reducing a level of the engine enrichment/air-fuel imbalance and reducing the secondary air flow upstream of the GPF in response to exhaust catalyst temperature reducing to below a threshold exhaust catalyst temperature, the threshold exhaust catalyst temperature higher than the light-off temperature. In any or all of the preceding examples, additionally or optionally, the injecting secondary air flow upstream of the exhaust catalyst includes adjusting an amount of the secondary air flow injected upstream of the exhaust catalyst based on a difference between a requested secondary air flow upstream of the exhaust catalyst and a measured air flow upstream of the exhaust catalyst, wherein the requested air flow is estimated as a function of each of a desired engine air fuel ratio, a desired catalyst air fuel ratio, and an engine air mass, and wherein the measured air flow is a function of each of an estimated engine air fuel ratio, an estimated exhaust catalyst air fuel ratio, and the engine air mass. In any or all of the preceding examples, additionally or optionally, the desired engine air fuel ratio is a function of a catalyst light-off temperature and the desired catalyst air fuel ratio is a function of a number of engine firing events, the catalyst air fuel ratio being the air fuel ratio of exhaust gas reaching the catalyst.

In yet another example, an engine system comprises: a controller with computer readable instructions stored on non-transitory memory to: during a first condition, increasing exhaust temperature upstream of an exhaust catalyst coupled to an exhaust of the engine by enriching an air fuel ratio of an air and fuel mixture combusted by the engine, and/or spark timing of spark delivered to the engine for ignition of the air and fuel mixture, and injecting air upstream of the exhaust catalyst; and during a second condition, increasing exhaust temperature upstream of an exhaust gasoline particulate filter (GPF) by enriching the engine air fuel ratio and injecting air upstream of the exhaust catalyst, while maintaining exhaust catalyst temperature above a first threshold temperature. In any preceding example, additionally or optionally, the first condition includes an estimated exhaust catalyst temperature being lower than an exhaust catalyst light-off temperature, and the second condition includes each of an estimated GPF particulate matter load being higher than a threshold load and an estimated GPF temperature being lower than a GPF regeneration temperature, the first threshold temperature higher than the exhaust catalyst light-off temperature. In any or all of the preceding examples, additionally or optionally, the maintaining exhaust catalyst temperature above a first threshold temperature includes adjusting a level of richness based on each of the estimated exhaust catalyst temperature, the estimated GPF temperature, the first threshold temperature, and the PF regeneration temperature, and wherein the exhaust catalyst temperature is estimated via a first exhaust temperature sensor coupled to an exhaust passage upstream of the exhaust catalyst and the GPF temperature is estimated via a second exhaust temperature sensor coupled to the exhaust passage upstream of the GPF. In any or all of the preceding examples, additionally or optionally, injection of secondary air flow upstream of the GPF is via a first injector coupled to an exhaust passage between the exhaust catalyst and the GPF and wherein the injection of secondary air flow upstream of the exhaust catalyst is via a second injector coupled to the exhaust passage upstream of the exhaust catalyst, each of the first injector and the second injector coupled to an air pump via distinct air lines and control valves.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
routing exhaust gases from an engine through a three-way catalyst (TWC) and then through a gasoline particulate filter (GPF);
controlling enrichment of the engine exhaust gases to be overall richer than stoichiometry at the GPF;
injecting air into the GPF to create an exotherm with the enriched exhaust gases entering the GPF in response to the GPF having a temperature higher than a first threshold temperature of an oxidation temperature of particulate matter deposited on the GPF and lower than a second threshold temperature of an ignition temperature of air and fuel in an exhaust passage upstream of the GPF; and
controlling a degree of the enrichment to reduce any induced cooling of the TWC caused by the enrichment.

2. The method of claim 1, wherein the injecting air into the GPF is from an air pump via a first air passage and a first air injector, the first air passage including a first control valve.

3. The method of claim 1, wherein creation of the exotherm is further in response to the GPF having a higher than threshold particulate matter load.

4. The method of claim 3, further comprising, in response to the GPF having each of the higher than threshold particulate matter load and the lower than second threshold temperature, one or more of retarding spark of engine ignition timing from maximum brake torque timing and operating engine cylinders with cylinder-to-cylinder air-fuel imbalance until GPF temperature reaches the first threshold temperature, the imbalance adjusted to maintain an overall stoichiometric exhaust air-fuel ratio.

5. The method of claim 4, wherein operating engine cylinders with the cylinder-to-cylinder air-fuel imbalance includes operating a first set of cylinders at richer than stoichiometry while operating a second set of cylinders at leaner than stoichiometry, a number of cylinders in each of the first set and the second set based on each of a difference between a measured particulate filter temperature and the first threshold temperature, and a measured mass air flow.

6. The method of claim 1, wherein the degree of the enrichment is adjusted in response to a decrease in TWC temperature during the enrichment of the engine exhaust gases, the degree of enrichment decreased in response to a higher than threshold rate of decrease in TWC temperature.

7. The method of claim 2, further comprising adjusting an amount of air injected upstream of the GPF based on a difference between a requested air flow and a measured air flow, wherein the requested air flow is estimated as a function of each of a desired engine air fuel ratio, a desired GPF air fuel ratio, and an engine air mass, and wherein the measured air flow is a function of each of an estimated engine air fuel ratio, an estimated GPF air fuel ratio, and the engine air mass.

8. The method of claim 7, wherein the adjusting the amount of air injected upstream of the GPF includes adjusting a duty cycle of an exhaust air injection pump and/or adjusting an opening of the first control valve, the duty cycle of the exhaust air injection pump increased and/or the opening of the first control valve increased in response to an increase in a difference between the requested air flow and the measured air flow.

9. The method of claim 7, wherein each of the desired engine air fuel ratio and the desired GPF air fuel ratio is based on the second threshold temperature, the GPF air fuel ratio being the air fuel ratio of exhaust gas reaching the GPF.

10. The method of claim 4, further comprising, during cold-start conditions, operating the engine with richer than stoichiometry air fuel ratio and/or operating engine cylinders with the cylinder-to-cylinder air-fuel imbalance while injecting air to an exhaust passage upstream of the TWC via a second air injector coupled to a second air passage, the second air passage including a second control valve.

11. A method, comprising:
routing exhaust gases from an engine through an exhaust catalyst and then through a gasoline particulate filter (GPF);
prior to exhaust catalyst light-off, adjusting engine air fuel ratio and injecting secondary air flow upstream of the exhaust catalyst; and
after the exhaust catalyst light-off,
in response to each of a higher than threshold particulate matter load on the GPF, and a lower than threshold GPF temperature, adjusting the engine air fuel ratio and injecting the secondary air flow upstream of the GPF to regenerate the GPF while maintaining an exhaust catalyst temperature above a light-off temperature, and maintaining the exhaust catalyst temperature above the light-off temperature by reducing the secondary air flow upstream of the GPF in response to the exhaust catalyst temperature reducing to below the light-off temperature.

12. The method of claim 11, wherein the adjusting the engine air fuel ratio includes one or more of enriching the engine air fuel ratio and operating engine cylinders with an air-fuel imbalance.

13. The method of claim 11, wherein the maintenance of the exhaust catalyst temperature above the light-off temperature includes reducing a level of the engine enrichment/ air-fuel imbalance in response to the exhaust catalyst temperature reducing to below a threshold exhaust catalyst temperature, the threshold exhaust catalyst temperature higher than the light-off temperature.

14. The method of claim 11, wherein the injecting secondary air flow upstream of the exhaust catalyst includes adjusting an amount of the secondary air flow injected upstream of the exhaust catalyst based on a difference between a requested secondary air flow upstream of the exhaust catalyst and a measured air flow upstream of the exhaust catalyst, wherein the requested air flow is estimated as a function of each of a desired engine air fuel ratio, a desired exhaust catalyst air fuel ratio, and an engine air mass, and wherein the measured air flow is a function of each of an estimated engine air fuel ratio, an estimated exhaust catalyst air fuel ratio, and the engine air mass.

15. The method of claim 14, wherein the desired engine air fuel ratio is a function of the exhaust catalyst light-off temperature and the desired exhaust catalyst air fuel ratio is a function of a number of engine firing events, the exhaust catalyst air fuel ratio being the air fuel ratio of exhaust gas reaching the exhaust catalyst.

16. An engine system, comprising:
a controller with computer readable instructions stored on non-transitory memory to:
during a first condition, increase exhaust temperature upstream of an exhaust catalyst coupled to an exhaust of an engine by enriching an air fuel ratio of an air and fuel mixture combusted by the engine, and/or spark timing of spark delivered to the engine for ignition of the air and fuel mixture, and injecting air upstream of the exhaust catalyst; and
during a second condition, increase exhaust temperature upstream of an exhaust gasoline particulate filter (GPF) by enriching the engine air fuel ratio and injecting air upstream of the GPF, while maintaining an exhaust catalyst temperature above a first threshold temperature by reducing injected air flow upstream of the GPF in response to the exhaust catalyst temperature reducing to below a light-off temperature.

17. The system of claim 16, wherein the first condition includes an estimated exhaust catalyst temperature being lower than an exhaust catalyst light-off temperature, and the second condition includes each of an estimated GPF particulate matter load being higher than a threshold load and an estimated GPF temperature being lower than a GPF regeneration temperature, the first threshold temperature higher than the exhaust catalyst light-off temperature.

18. The system of claim 17, wherein maintaining the exhaust catalyst temperature above the first threshold temperature includes adjusting a level of richness based on each of the estimated exhaust catalyst temperature, the estimated GPF temperature, the first threshold temperature, and the GPF regeneration temperature, and wherein the exhaust catalyst temperature is estimated via a first exhaust temperature sensor coupled to an exhaust passage upstream of the exhaust catalyst and the GPF temperature is estimated via a second exhaust temperature sensor coupled to the exhaust passage upstream of the GPF.

19. The system of claim 16, wherein injection of secondary air flow upstream of the GPF is via a first injector coupled to an exhaust passage between the exhaust catalyst and the GPF and wherein the injected air flow upstream of the exhaust catalyst is via a second injector coupled to the exhaust passage upstream of the exhaust catalyst, each of the first injector and the second injector coupled to an air pump via distinct air lines and control valves.

* * * * *